US012601917B2

(12) United States Patent
Yoon et al.

(10) Patent No.: US 12,601,917 B2
(45) Date of Patent: Apr. 14, 2026

(54) GLASSES-TYPE AUGMENTED REALITY APPARATUS AND SYSTEM WITH COMPACT DIMENSIONS

(71) Applicant: Korea Photonics Technology Institute, Gwangju (KR)

(72) Inventors: Seon Kyu Yoon, Gwangju (KR); Jin Su Lee, Gwangju (KR); Sung Jin Lim, Gwangju (KR); Ji Yeon Kim, Jeonju-si (KR)

(73) Assignee: Korea Photonics Technology Institute, Gwangju (KR)

( * ) Notice: Subject to any disclaimer, the term of this patent is extended or adjusted under 35 U.S.C. 154(b) by 385 days.

(21) Appl. No.: 18/315,898

(22) Filed: May 11, 2023

(65) Prior Publication Data

US 2024/0168292 A1     May 23, 2024

(30) Foreign Application Priority Data

Nov. 22, 2022     (KR) ......................... 10-2022-0157298

(51) Int. Cl.
  *G02B 27/01*     (2006.01)
  *G02B 5/32*     (2006.01)
(52) U.S. Cl.
  CPC ........... *G02B 27/0172* (2013.01); *G02B 5/32* (2013.01); *G02B 2027/0174* (2013.01); *G02B 2027/0178* (2013.01)

(58) Field of Classification Search
  CPC ........................... G02B 5/0252; G02B 5/0284; G02B 27/0172; G02B 27/0179
  USPC ............................................ 359/15, 630, 569
  See application file for complete search history.

(56) References Cited

U.S. PATENT DOCUMENTS

| | | | |
|---|---|---|---|
| 2017/0176752 A1 | 6/2017 | Vieira et al. | |
| 2017/0176755 A1* | 6/2017 | Cai | G02B 27/0179 |
| 2020/0355929 A1 | 11/2020 | Zhang | |
| 2023/0273352 A1* | 8/2023 | Cano | G03H 1/265 359/1 |
| 2024/0118545 A1* | 4/2024 | Kim | G02B 5/18 |

* cited by examiner

*Primary Examiner* — Audrey Y Chang
(74) *Attorney, Agent, or Firm* — Dinsmore & Shohl LLP; Yongsok Choi, Esq.

(57)     ABSTRACT

This disclosure relates to a glasses-type augmented reality apparatus, and system with compact dimensions. An aspect of the present embodiment provides an augmented reality apparatus which provides a wearer with a digital holographic image incident from the outside as a holographic image, the apparatus including a plurality of holographic optical elements (HOEs) arranged in the form of concentric circles having different radii inside an optical configuration worn by the wearer to diffract the incident digital holographic image and provide the diffracted digital holographic image to the wearer.

12 Claims, 3 Drawing Sheets

GLASSES-TYPE AUGMENTED REALITY APPARATUS AND SYSTEM WITH COMPACT DIMENSIONS

CROSS-REFERENCE TO RELATED APPLICATION

This application claims priority to Korean Patent Application No. 10-2022-0157298 filed on Nov. 22, 2022, the entire contents of which are herein incorporated by reference.

TECHNICAL FIELD

The present disclosure relates to a glasses-type augmented reality apparatus, and system which improve a convenience for a wearer by compacting their dimensions.

BACKGROUND ART

The contents described in this section merely provide background information about the present embodiment, and do not constitute the prior art.

The term "augmented reality" refers to the mixing of real world information with virtual images by inserting a three-dimensional image into a real environment.

The real world information may include information which is not necessary for a user, or may sometimes lack information which is necessary for a user. By combining the real world and the virtual world, an augmented reality system causes the interaction between the real world and the information necessary for the user in real time.

A conventional augmented reality apparatus is shown in FIGS. 5A and 5B.

As shown in FIG. 5A, the conventional augmented reality apparatus 510 should include a light source for outputting an augmented reality image, an optical system for enabling the augmented reality image outputted together with the light of the real world to be incident into the wearer's eyeball, a battery for powering the light source, and the like. Accordingly, it has been implemented in a fairly large size like a head mounted display (HMD). However, when the augmented reality apparatus is implemented in such a large size, the wearer inevitably experiences considerable inconvenience in wearing it, and for a wearer who wears glasses or the like, it causes inconvenience to the wearer even at a time when the wearer merely puts it on.

In order to solve such problems, a glasses-type augmented reality apparatus 520 as shown in FIG. 5B has appeared. The augmented reality apparatus 520 is implemented approximately in the size and shape of general glasses, so that it is shaped in a configuration wearable by a wearer. On one side of the apparatus, an optical system 525 and the like are positioned, which output an output image to the wearer's eyeballs. However, since the conventional glasses-type augmented reality apparatus 520 should eventually include the optical system 525 implemented with a plurality of optical components, the significant increase in the weight of the apparatus has not been avoidable, and the optical system has problematically blocked the viewer's visual field.

SUMMARY OF THE INVENTION

Technical Problem

An object of an embodiment of the present disclosure is to provide a glasses-type augmented reality apparatus, and system, which are capable of reducing the obstruction of the wearer's visual field by compacting their volumes, and of decreasing the weight burden on the wearer.

Technical Solution

According to an aspect of the present disclosure, there is provided an augmented reality apparatus which provides a wearer with a digital holographic image incident from the outside as a holographic image, the apparatus including a plurality of holographic optical elements (HOEs) arranged in the form of concentric circles having different radii inside an optical configuration worn by the wearer to diffract the incident digital holographic image and provide the diffracted digital holographic image to the wearer.

According to an example, the concentric circles of the holographic optical elements are arranged spaced apart from each other by a preset first interval.

According to an example, the preset first interval is within a preset error range based on $1/60°$.

According to an example, the holographic optical elements are arranged such that the holographic optical elements arranged in the same concentric circle are arranged spaced apart from each other by a preset second interval.

According to an example, the preset second interval is within a preset error range based on $1/60°$.

According to an example, each of the holographic optical elements has a preset radius.

According to another aspect of the present disclosure, there is provided an augmented reality apparatus which provides a wearer with a digital holographic image incident from the outside as a holographic image, the apparatus including: an optical configuration which the wearer wears; and a plurality of holographic optical elements (HOEs) arranged in the form of concentric circles having different radii inside the optical configuration to diffract the incident digital holographic image and provide the diffracted digital holographic image to the wearer.

According to an example, the concentric circles of the holographic optical elements are arranged spaced apart from each other by a preset first interval.

According to an example, the preset first interval is within a preset error range based on $1/60°$.

According to an example, the holographic optical elements are arranged such that the holographic optical elements arranged in the same concentric circle are arranged spaced apart from each other by a preset second interval.

According to an example, the preset second interval is within a preset error range based on $1/60°$.

According to an example, each of the holographic optical elements has a preset radius.

According to still another aspect of the present disclosure, there is provide an augmented reality system which enables a wearer to watch a holographic image, the system including: a projector which outputs a digital holographic image (computer generated holography (CGH)) to an arbitrary space; and a plurality of holographic optical elements (HOEs) arranged in the form of concentric circles having different radii inside an optical configuration worn by the wearer to diffract the incident digital holographic image and provide the diffracted digital holographic image to the wearer.

According to yet still another aspect of the present disclosure, there is provided an augmented reality system which enables a wearer to watch a holographic image, the system including: a projector which outputs a digital holographic image (computer generated holography (CGH)) to an arbitrary space; an optical configuration which the wearer wears; and a plurality of holographic optical elements (HOEs) arranged in the form of concentric circles having different radii inside the optical configuration to diffract the incident digital holographic image and provide the diffracted digital holographic image to the wearer.

Advantageous Effects

As described above, according to one aspect of the present disclosure, there is an advantage of reducing the obstruction of the wearer's visual field by compacting the volume, and of reducing the weight burden on the wearer.

DETAILED DESCRIPTION

Figure 1:
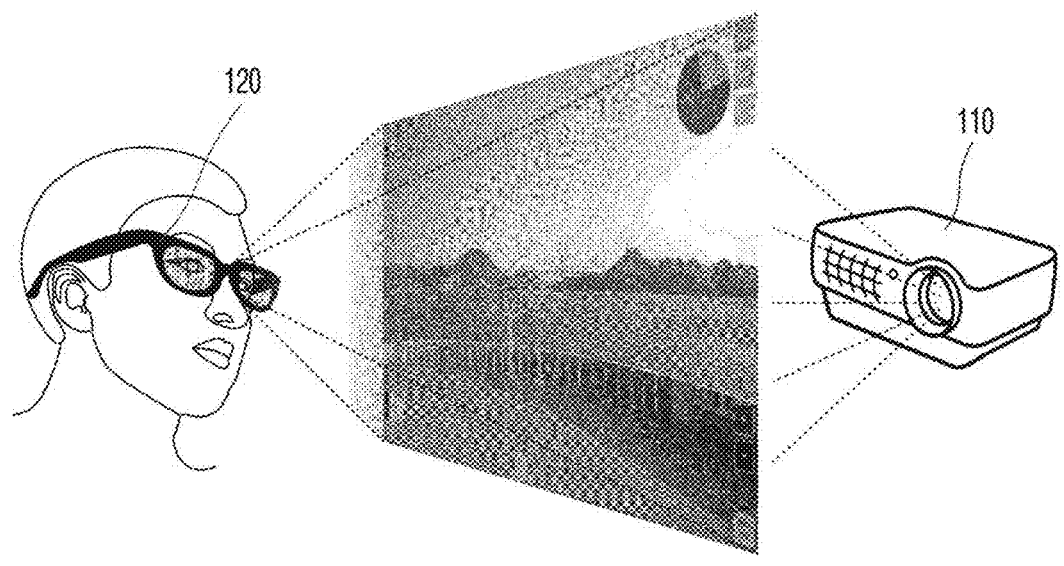
FIG. 1 is a diagram showing the configuration of an augmented reality system according to an embodiment of the present disclosure.

Although the present disclosure may be modified in various forms, specific embodiments thereof will be described in detail and illustrated in the drawings. However, this is not intended to limit the present embodiment to a specific form of disclosure, and it should be understood that all changes, equivalents, and substitutes are included in the technical idea and scope of the present disclosure. At the time of describing respective drawings, like reference numerals have been used for like components.

Terms, such as "first", "second," A, and B, can be used to describe various components, but the components should not be limited by the terms. Said terms are used in order only to distinguish one component from another component. For example, the first component can be designated as the second component without departing from the scope of the present disclosure, and, similarly, the second component can also be designated as the first component. The term "and/or" includes a combination of a plurality of related listed items or any of the plurality of related listed items.

Further, when one component is referred to as being "connected to" or "coupled to" another element, this can be understood as that the one component is directly connected or coupled to that other component, or any intervening component is also present therebetween. Contrarily, when one component is referred to as being "directly connected to" or "directly coupled to" to another component, this can be understood as that no other element is present therebetween.

The terms used in this application are used to merely describe specific embodiments, but are not intended to limit the disclosure. Singular expressions may include the meaning of plural expressions unless the context clearly indicates otherwise. As used in this application, it should be understood that the terms "comprise", "have", and the like do not preclude the possibility of the presence or addition of features, numbers, steps, actions, components, parts stated in the specification, or combinations thereof.

Unless otherwise defined, all terms used herein, including technical or scientific terms, have the same meaning as commonly understood by a person of ordinary skill in the art to which the present disclosure pertains.

Terms as defined in a commonly used dictionary should be interpreted as having a meaning consistent with the meaning in the context of the related technology, and are not to be interpreted as an ideal or excessively formal meaning unless explicitly defined in this application.

Additionally, each configuration, process, procedure, method, or the like included in each embodiment of the present disclosure may be combined with each other unless a mutual contradiction arises in a technical context.

FIG. 1 is a diagram showing the configuration of an augmented reality system according to an embodiment of the present disclosure.

Referring to FIG. 1, an augmented reality system 100 according to an embodiment of the present disclosure includes a projector 110 and a glasses-type augmented reality apparatus 120.

The projector 110 outputs a digital holographic image (i.e., computer generated holography (CGH)) onto an arbitrary space. The projector 110 outputs the digital holographic image, rather than a simple light having a specific wavelength band. The digital holographic image refers to an image in which a complex light wave (including an amplitude and phase distribution of the object beam) is optically acquired and reproduced by the use of an interference phenomenon with the reference beam. Particularly, the digital holographic image corresponds to an image obtained by calculating the complex light wave through a numerical method instead of through an optical experiment. The projector 110 outputs not the simple light but the digital holographic image which can be viewed only by a person wearing the glasses-type augmented reality apparatus 120 among people located in an arbitrary space.

The projector 110 outputs a preset digital holographic image. The digital holographic image passes through a diffraction element and is recognized as a holographic image (augmented reality image) by the wearer. In this regard, even if the content of the digital holographic image is the same, the digital holographic image is realized differently according to the diffraction characteristics of the diffraction element. Since the digital holographic image is recognized by the wearer by being introduced into the wearer's eyeball after having been diffracted by the diffraction element, there exists the corresponding digital holographic image depending on the characteristics of the diffraction element. The projector 110 outputs the digital holographic image corresponding to the glasses-type augmented reality apparatus 120, and more specifically, only to the glasses-type augmented reality apparatus 120. Accordingly, even if there are a multitude of people within the same place, only the person who wears the glasses-type augmented reality apparatus 120, can watch the digital holographic image.

The glasses-type augmented reality apparatus 120 receives the digital holographic image outputted from the projector 110, and provides the holographic image to the wearer. The glasses-type augmented reality apparatus 120 includes only a plurality of holographic optical elements (HOEs) in an optical configuration (lens) such as glasses to be worn by a wearer. The glasses-type augmented reality apparatus 120 includes only the holographic optical elements in the optical configuration without an optical system implemented with a plurality of optical configurations. Since only the holographic optical elements are included in the augmented reality apparatus, the weight of the augmented reality apparatus does not significantly increase, and since they are arranged inside the optical configuration, they do not obstruct the wearer's visual field. Since the holographic optical elements are arranged inside the optical configuration to be worn by a wearer, the digital holographic image incident to the glasses-type augmented reality apparatus 120 is diffracted by the holographic optical elements, and recognized as an augmented reality image by the wearer. The specific structure of the glasses-type augmented reality apparatus 120 will be described below with reference to FIGS. 2 and 3.

Although FIG. 1 shows the projector 110 as being implemented in a specific space, the position of the projector is not necessarily limited to this. It may be implemented in different forms depending on the contents of the images to be provided to the glasses-type augmented reality apparatus 120. In the case of educational, security, or confidential materials to be provided to a limited number of people, the projector 110 may be implemented with a projector apparatus installed in a specific space. However, in the case of advertising materials to be provided to random persons located in a specific space, the projector 110 may be implemented in various forms, for example, with a general light source, such as LED or LCD, an electronic display board, or the like.

Even if the projector 110 is implemented with the general light source, the electronic display board, or the like, the wearer of the glasses-type augmented reality apparatus 120 may not be excessively disturbed by randomly provided augmented reality images. FIG. 4A shows a process of recognizing an image or the like in the eyeball of the wearer.

Figure 4:
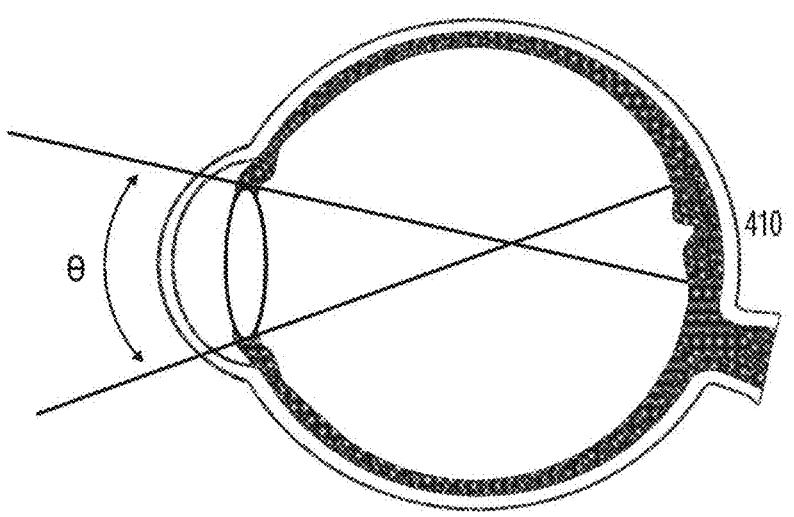
FIG. 4 is a diagram showing a section in which an augmented reality image is clearly recognized by the wearer.
Figure 5A:
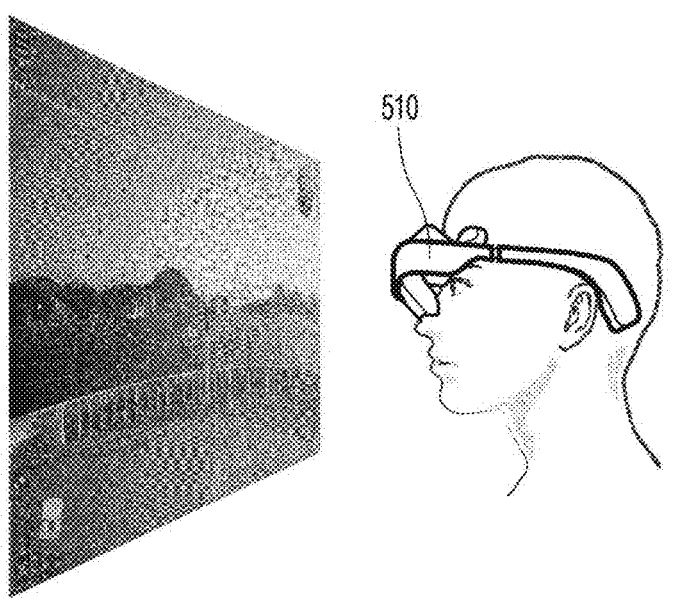
FIGS. 5A and 5B are diagrams showing a conventional augmented reality apparatus.
Figure 5B:
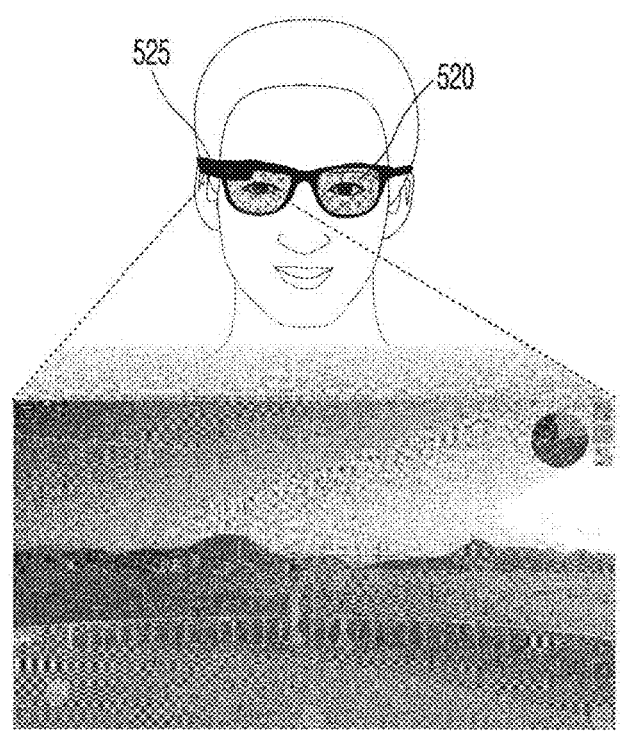

FIG. 4 is a diagram showing a section in which an augmented reality image is clearly recognized by the wearer.

Referring to FIG. 4, even when light corresponding to various external stimuli, such as an image, is incident into the wearer's eyeball, the wearer can clearly recognize only the light incident to a site where the fovea 410 is located, and light incident out of that site is inaccurately recognized in a blurred form. The angle θ at which the light can be incident on the site where the fovea 410 is located ranges only from about 10 to 15°, and the wearer cannot accurately recognize the light incident at an angle other than that angle range into the wearer's pupil.

Referring back to FIG. 1, even if the projector 110 randomly emits a holographic image within a specific space for the purpose of advertising or the like, the wearer does not wholly recognize the holographic image unless the wearer looks exactly along the direction in which the projector 110 emits the holographic image.

Accordingly, the wearer can see the holographic image by looking at the projector 110 after wearing the glasses-type augmented reality apparatus 120. As soon as the digital holographic image is incident to the glasses-type augmented reality apparatus 120, it can be recognized as a holographic image by the wearer, so no additional delay can occur in outputting the augmented reality image.

Figure 2:
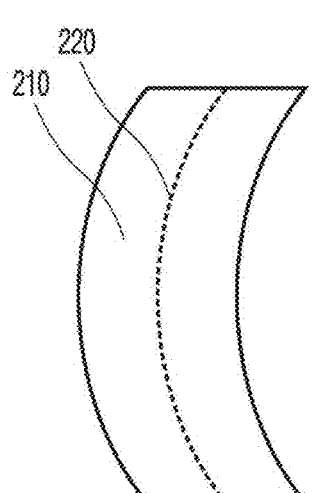
FIG. 2 is a cross-sectional view of the glasses-type augmented reality apparatus according to an embodiment of the present disclosure.
Figure 3:
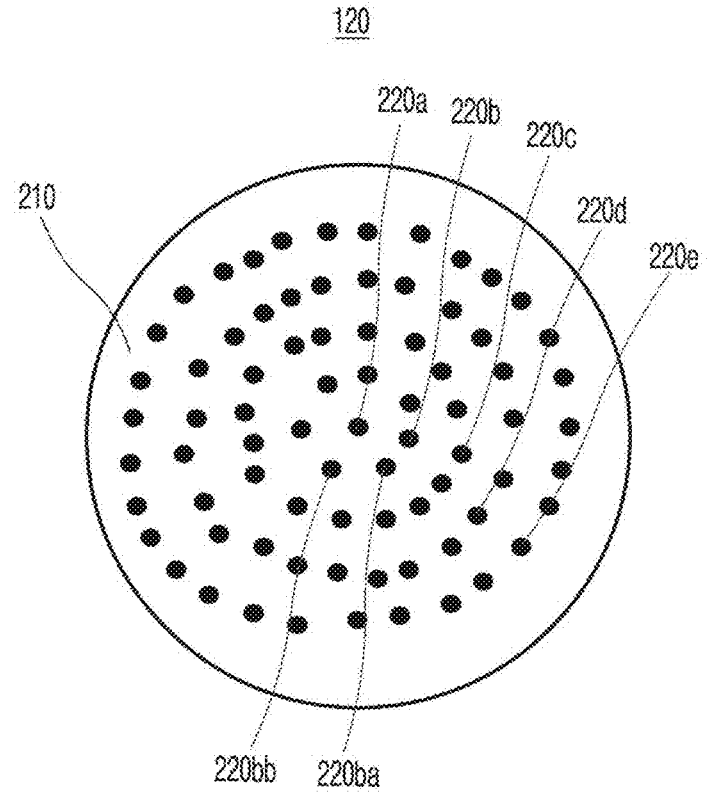
FIG. 3 is a plan view of the glasses-type augmented reality apparatus according to an embodiment of the present disclosure.

FIG. 2 is a cross-sectional view of the glasses-type augmented reality apparatus according to an embodiment of the present disclosure, and FIG. 3 is a plan view of the glasses-type augmented reality apparatus according to an embodiment of the present disclosure.

Referring to FIGS. 2 and 3, the glasses-type augmented reality apparatus 120 according to an embodiment of the present disclosure includes the plurality of holographic optical elements 220.

The holographic optical elements 220 are disposed inside the optical configuration 210 to be worn by a wearer, such that they are arranged in the form of concentric circles with different radii which have a common center at the center of the optical configuration.

In this regard, each of the holographic optical elements 220 has a preset size, and they are arranged to satisfy preset conditions.

Each of the holographic optical elements 220 is implemented so as not to have a diameter equal to or greater than 1/180°. If the holographic optical element 220 is larger than the aforementioned size range, distortion of real world light incident to the wearer from the outside of the glasses-type augmented reality apparatus 120 is caused. Accordingly, a sense of difference may be caused to the wearer.

The holographic optical elements 220a to 220e are arranged in the form of concentric circles, and the concentric circles 220a to 220e are spaced apart from each other by about 1/60°. For a human being with visual acuity of 1.0, the interval of the visual cells in the retina corresponds to 1/60°. Therefore, if the interval between the holographic optical elements 220 is greater than the above-mentioned interval, this may lead to a problem in that the resolution of the holographic image is lowered, whereas if the interval is less than the above-mentioned interval, the number of holographic optical elements 220 is increased, but the wearer cannot recognize this, resulting in inefficiency, and due to the increased number of holographic optical elements 220, the distortion of real world light incident to the wearer's eyeball may also occur. Accordingly, the concentric circles 220a to 220e of the holographic optical elements are spaced apart from each other by about 1/60°.

Similarly, the holographic optical elements (e.g., 220ba, 220bb) within the same diameter (any one of 220a to 220e) are also spaced apart from each other by an interval of about 1/60° for the same reason.

Accordingly, since the glasses-type augmented reality apparatus 120 includes only the plurality of holographic optical elements 220, it is possible to quickly provide the holographic image to the wearer without obstructing the incidence of the real world light. Additionally, the glasses-type augmented reality apparatus 120 can generally provide the holographic image without blocking the wearer's visual field while rarely increasing the weight of the optical configuration to be worn by the wearer.

The above description is merely illustrative of the technical idea of the present embodiment, and various modifications and changes can be made by those of ordinary skill in the art to which the present embodiment pertains, without departing from the essential characteristics of the present embodiment. Accordingly, the embodiments are not for limiting, but for explaining the technical spirit of the present embodiment, and the scope of the technical idea of the present embodiment is not limited by these embodiments. The protection scope of the present embodiment should be construed based on the following claims, and all technical ideas within the scope equivalent thereto should be construed as being included in the scope of the present embodiment.

REFERENCE SIGN LIST

100: Augmented reality system
110: Projector
120: Glasses-type augmented reality apparatus
210: Optical configuration
220: Holographic optical element
510, 520: Augmented reality apparatus

The invention claimed is:

1. An augmented reality apparatus configured to receive, from an outside of the augmented reality apparatus, a digital holographic image that is viewable only by a wearer and provide the wearer with the digital holographic image incident as a holographic image, the apparatus comprising only:

a plurality of holographic optical elements (HOEs) arranged in a form of concentric circles having different radii inside an optical configuration worn by the wearer to diffract the incident digital holographic image and provide the diffracted digital holographic image to the wearer such that the digital holographic image is recognized as an augmented reality image, wherein each of the holographic optical elements has an angular diameter that is less than 1/180°.

2. The apparatus of claim 1, wherein the concentric circles of the holographic optical elements are arranged spaced apart from each other by a preset first interval.

3. The apparatus of claim 2, wherein the preset first interval is within a preset error range based on 1/60°.

4. The apparatus of claim 1, wherein the holographic optical elements are arranged such that the holographic optical elements arranged in the same concentric circle are arranged spaced apart from each other by a preset second interval.

5. The apparatus of claim 4, wherein the preset second interval is within a preset error range based on 1/60°.

6. The apparatus of claim 1, wherein each of the holographic optical elements has a preset radius.

7. An augmented reality apparatus configured to receive, from an outside of the augmented reality apparatus, a digital holographic image that is viewable only by a wearer and provide the wearer with a digital holographic image incident as a holographic image, the apparatus comprising only:

an optical configuration which the wearer wears; and a plurality of holographic optical elements (HOEs) arranged in a form of concentric circles having different radii inside the optical configuration to diffract the incident digital holographic image and provide the diffracted digital holographic image to the wearer such that the digital holographic image is recognized as an augmented reality image, wherein each of the holographic optical elements has an angular diameter that is less than 1/180°.

8. The apparatus of claim 7, wherein the concentric circles of the holographic optical elements are arranged spaced apart from each other by a preset first interval.

9. The apparatus of claim 8, wherein the preset first interval is within a preset error range based on 1/60°.

10. The apparatus of claim 7, wherein the holographic optical elements are arranged such that the holographic optical elements arranged in the same concentric circle are arranged spaced apart from each other by a preset second interval.

11. The apparatus of claim 10, wherein the preset second interval is within a preset error range based on 1/60°.

12. An augmented reality system which enables a wearer to watch a holographic image, the system comprising:

a projector which outputs a digital holographic image (computer generated holography (CGH)) that is viewable only by the wearer wearing an augmented reality apparatus to an arbitrary space; and the augmented reality apparatus including only a plurality of holographic optical elements (HOEs) arranged in a form of concentric circles having different radii inside an optical configuration worn by the wearer to diffract an incident digital holographic image and provide the diffracted digital holographic image to the wearer such that the digital holographic image is recognized as an augmented reality image, wherein each of the holographic optical elements has an angular diameter that is less than 1/180°.

* * * * *